US008136441B2

(12) United States Patent
Darbois et al.

(10) Patent No.: US 8,136,441 B2
(45) Date of Patent: Mar. 20, 2012

(54) HYDRAULIC MACHINE, IN PARTICULAR HYDRAULIC MOTOR, WITH A RECIPROCATING MOVEMENT, AND DIFFERENTIAL PISTON FOR SUCH A MACHINE

(75) Inventors: Matthieu Darbois, Bordeaux (FR); Sébastien Furet, Bruges (FR); Philippe Duquennoy, Camarsac (FR); Dominique Berton, Le Bouscat (FR)

(73) Assignee: Dosatron International, Tresses (FR)

( * ) Notice: Subject to any disclaimer, the term of this patent is extended or adjusted under 35 U.S.C. 154(b) by 855 days.

(21) Appl. No.: 12/160,431

(22) PCT Filed: Dec. 7, 2006

(86) PCT No.: PCT/FR2006/002675

§ 371 (c)(1), (2), (4) Date: Jul. 10, 2008

(87) PCT Pub. No.: WO2007/080251

PCT Pub. Date: Jul. 19, 2007

(65) Prior Publication Data

US 2010/0269685 A1 Oct. 28, 2010

(30) Foreign Application Priority Data

Jan. 13, 2006 (FR) ...................................... 06 00313

(51) Int. Cl.
*F16J 9/12* (2006.01)

(52) U.S. Cl. ................................ 92/244; 91/235; 91/342

(58) Field of Classification Search .................... 91/224, 91/235, 342; 92/244
See application file for complete search history.

(56) References Cited

U.S. PATENT DOCUMENTS

| | | | | |
|---|---|---|---|---|
| 217,626 | A * | 7/1879 | Lyman | 91/342 |
| 1,362,435 | A * | 12/1920 | Neraas | 92/244 |
| 1,595,939 | A * | 8/1926 | Hukill et al. | 91/342 |
| 6,684,753 | B1 | 2/2004 | Urrutia | |

FOREIGN PATENT DOCUMENTS

| | | |
|---|---|---|
| DE | 200 04 675 U1 | 6/2000 |
| DE | 200 01 503 U1 | 4/2001 |
| EP | 1 151 196 | 8/2000 |
| FR | 2 205 361 A | 5/1974 |
| WO | 96/05428 A | 2/1996 |

* cited by examiner

*Primary Examiner* — Daniel Lopez
(74) *Attorney, Agent, or Firm* — Young & Thompson

(57) ABSTRACT

Hydraulic machine, in particular hydraulic motor, comprising a casing, a differential piston (4) having a region of large cross section and a region of smaller cross section, which can slide with a reciprocating movement respectively in the casing and in a housing coaxial to, and of smaller diameter than, the casing, the piston separating two chambers of the casing and being provided at the location of its large cross section and its small cross section with sealing lips (48, 49) which are oriented in opposite directions and which face one another. The sealing lips (48, 49) are provided on detachable circular rings (50, 51), and the piston (4) is molded in one piece.

14 Claims, 5 Drawing Sheets

HYDRAULIC MACHINE, IN PARTICULAR HYDRAULIC MOTOR, WITH A RECIPROCATING MOVEMENT, AND DIFFERENTIAL PISTON FOR SUCH A MACHINE

The invention relates to a hydraulic machine, particularly a hydraulic motor, i.e. a machine of the type comprising:

a casing;

a differential piston having a region of large cross section and a region of smaller cross section capable of sliding in a reciprocating movement in the casing and in a smaller-diameter housing coaxial to the casing, respectively, the piston separating two chambers of the casing;

hydraulic switching means for supplying liquid to and emptying the chambers separated by the piston, these switching means being controlled by the movements of the piston and being able to adopt two stable positions;

and triggering means capable, at the end of the travel of the piston, of causing a sudden change in the position of the switching means, under the action of an elastic means, in order to reverse the travel, the piston being equipped, in the region of its large cross section and of its small cross section, with sealing lips directed in opposite directions and facing toward one another.

A hydraulic motor of this kind is known, for example, from EP-B-0 255 791 or from U.S. Pat. No. 5,505,224 or from EP-B-1 151 196. This hydraulic motor can be used to drive a device that injects an additive into a main liquid that operates the motor.

In known motors, each sealing lip is molded as one piece with the corresponding region of the piston. The regions of the piston that have different cross sections are produced separately and then assembled.

Although this solution is satisfactory in terms of sealing and operation, it lacks flexibility in respect of manufacture and maintenance. In practical terms, when a sealing lip becomes damaged, at least the corresponding part of the piston and, in general, the entire piston, has to be changed.

It is an object of the invention first and foremost to provide a hydraulic machine of the abovementioned type, particularly a hydraulic motor, the piston of which is simpler to manufacture and which is easier to maintain.

It is also desirable to improve the conditions in which sealing between the different cross sections of the piston and the wall of the casing or of the housing occurs.

According to the invention, a hydraulic machine with a reciprocating movement, particularly a hydraulic motor, of the aforementioned type, is characterized in that the sealing lips are provided on detachable circular rings and the piston is molded as a single piece.

Advantageously, each sealing ring is fixed to the piston by an assembly of the bayonet type. Preferably, radial projections are provided on the internal surface of the ring and corresponding peripheral slots on the external surface of the piston, with slots parallel to the geometric axis of the piston to allow each projection of the ring to align with a corresponding peripheral slot of the piston.

Preferably, the sealing ring for the large cross section of the piston has a V-shaped profile the concave face of which faces toward the small cross section end and, on the opposite side, has a frustoconical sealing lip the diameter of which increases in the direction toward the cover of the casing.

The circular ring for the small cross section of the piston has a V-shaped cross section the concave face of which faces toward the large cross section end.

As a preference, the rings are designed to clip onto the piston at the end of the turning of the bayonet assembly.

Advantageously, the detachable circular rings are made of plastic.

The invention also relates to a differential piston for a hydraulic machine as defined hereinabove, the piston having a region of large cross section and a region of smaller cross section able to slide in a reciprocating movement in a casing and in a smaller-diameter barrel coaxial with the casing, respectively, the piston separating two chambers of the casing, and being equipped in the region of its large cross section and of its small cross section with sealing lips directed in opposite directions and facing toward one another, characterized in that it is molded as a single piece and comprises means of assembly with detachable circular rings on which the sealing lips are provided.

The means of assembly are advantageously of the bayonet type and preferably comprise slots on the external surface of the piston, with slots parallel to the geometric axis of the piston to allow radial ribs on the internal surface of a sealing ring to align with a corresponding peripheral slot of the piston.

Advantageously, the differential piston comprises at least one aperture for the clip-fastening of at least one ring at the end of bayonet assembly.

Apart from the provisions set out hereinabove, the invention consists in a certain number of other provisions that will be covered more fully hereinafter with reference to an entirely nonlimiting exemplary embodiment described with reference to the attached drawings. In these drawings.

Figure 1:
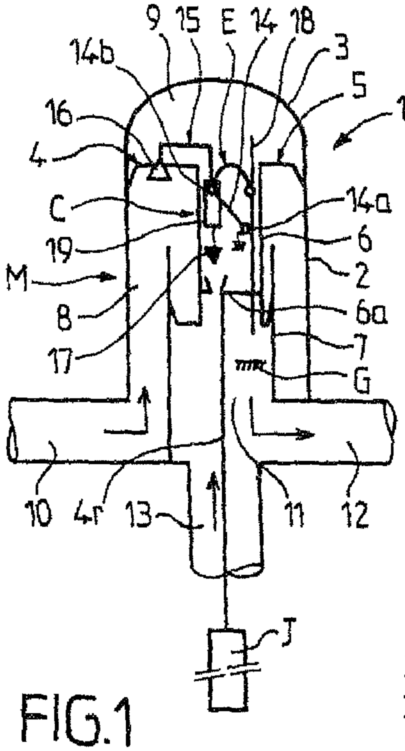
FIG. 1 is a simplified schematic depiction in vertical section of a hydraulic motor according to the invention.
Figure 2:
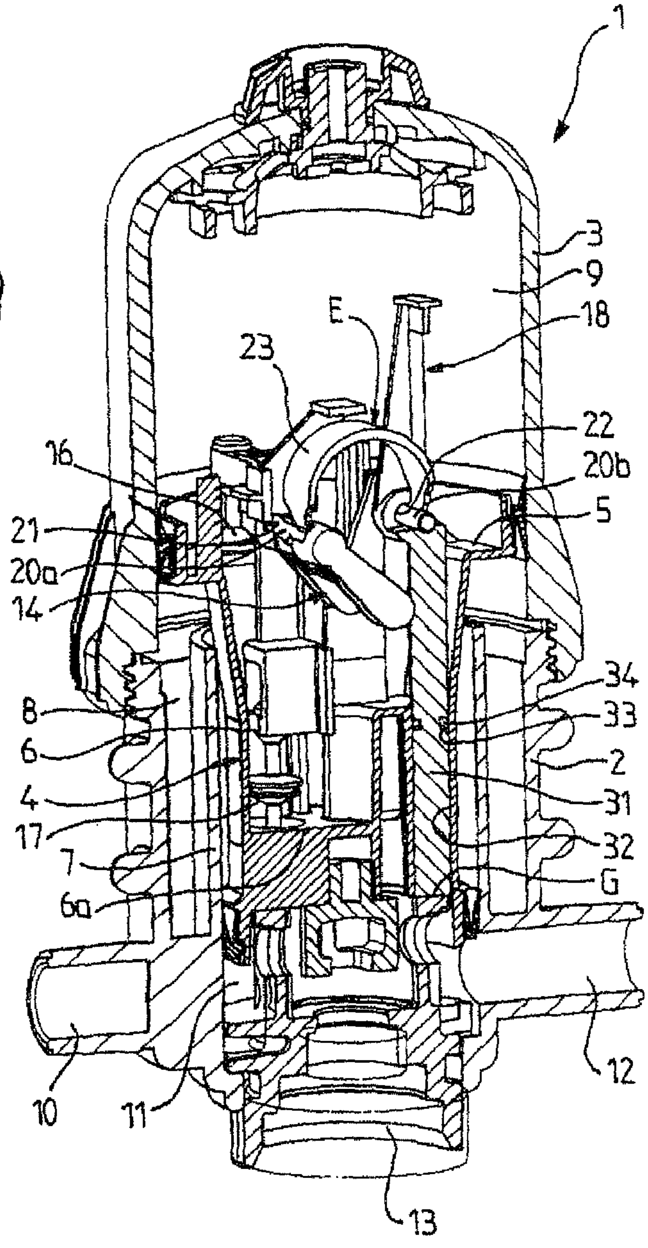
FIG. 2 is a perspective view, in vertical section, of a hydraulic motor according to the invention.

Reference is made to the drawings, and in particular to FIGS. 1 and 2, which show a hydraulic machine consisting of a differential hydraulic motor with reciprocating movement.

The motor M comprises a casing 1 consisting of a cylindrical body 2 surmounted by a cover 3 assembled with the body 2 such that it can be disassembled, particularly by screwing.

A differential piston 4 is positioned in the casing 1 to slide in a reciprocating movement. At the top, the piston 4 comprises a region 5 of large cross section, in the form of an annulus, the periphery of which bears in a sealed manner against the internal wall of the casing 1. A substantially cylindrical barrel 6 coaxial with the casing 1 and of a smaller diameter than the annulus 5 is secured to this annulus and extends downward. The lower part of the barrel 6 slides in a sealed manner in a cylindrical housing 7 coaxial with the casing 1. The barrel 6 is closed at the bottom by an end wall 6*a*, constituting the region of small cross section of the piston.

The piston 4 divides the interior volume of the casing 1 into two chambers, these being respectively: 8 which is situated below the annulus 5, and 9, which is situated above the annulus 5. The chamber 8 is an annular chamber contained between the casing 1, the external surface of the housing 7 and the external surface of the barrel 6. An inlet 10 opens into the bottom of the chamber 8. The interior volume of the housing 7 situated below the end wall 6*a* of the piston constitutes a third chamber 11, or outlet chamber, to which an outlet 12 is connected, its axis being orthogonal to that of the casing.

A cylindrical sleeve 13 coaxial with the casing 1 extends downward to allow for coupling to a device J that injects a liquid additive into the outlet chamber 11. This injection device is operated by the motor the piston 4 of which is connected via a rod 4*r* to an additive pumping means. For further details regarding this type of motor, reference may be made to EP 0 255 791 or EP 1 151 196.

Hydraulic switching means C are provided for supplying liquid to and emptying the chambers 8, 9 separated by the piston. These switching means C are controlled by the movements of the piston 4 and comprise a link rod 14 acting on a directional control member 15 capable of adopting two stable positions. In one of the stable positions, the chamber 8 receives the pressurized liquid while the chamber 9 is connected to the outlet 12. In the other position of the directional control member 15, the chamber 9 receives the pressurized liquid and is isolated from the chamber 11.

In the example depicted in the drawings, the directional control member 15 consists of a valve holder comprising at least a first valve shutter 16 the seat of which lies under the annulus 5, the valve shutter 16 having a head situated in the chamber 8. The valve shutter 16 closes by moving upwards as shown in the drawings. The directional control member 15 is equipped with at least one other valve shutter 17 the head of which lies in the chamber 9. The seat for each valve shutter 17 is located on the end wall 6*a*. The valve shutter 17 closes by dropping down onto its seat.

The motor further comprises triggering means comprising a push rod 18 capable, at the end of the travel of the piston, by coming into abutment against a stop, of causing a sudden change in the position of the switching means C under the action of an elastic means E, in order to reverse the travel of the piston.

The link rod 14 is articulated at one end 14*a* to a point that is fixed relative to the piston 4. The other end 14*b* of the link rod can move in a vertical aperture 19 of the valve holder and come into abutment against one of the two ends of this aperture, in one of the two stable positions of the directional control member 15.

Figure 6:
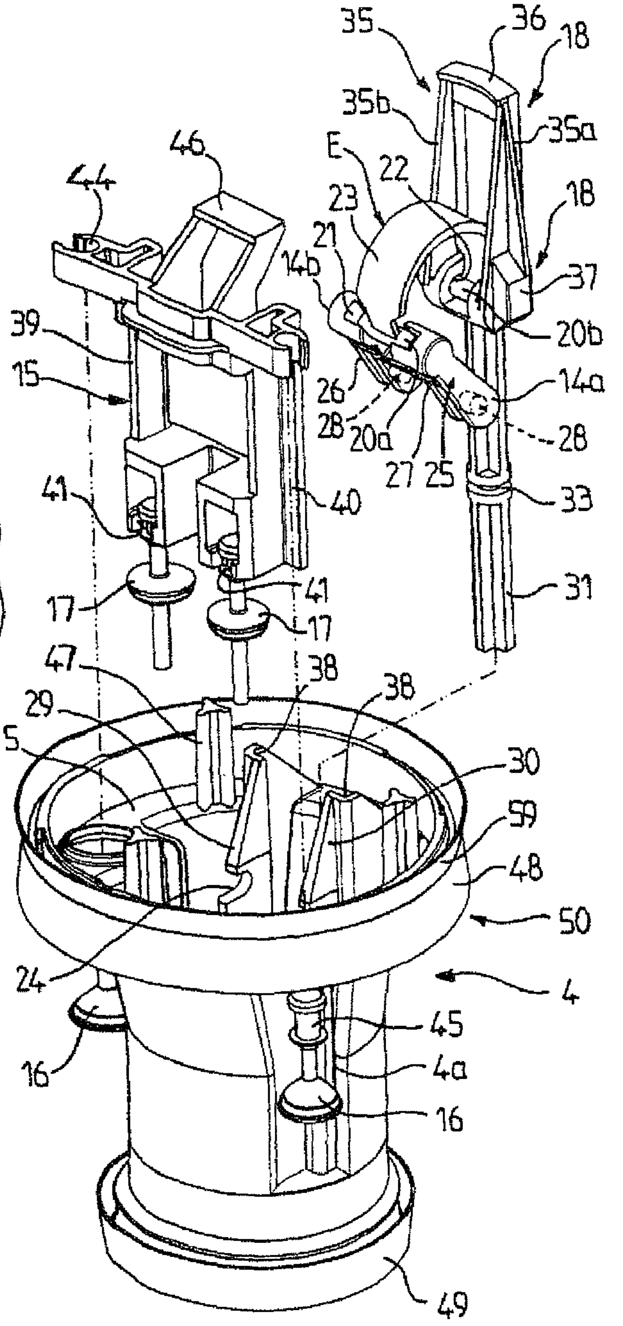
FIG. 6 is an exploded perspective view of the piston of FIG. 5 and of the various components disassembled.

According to the invention and as visible in FIGS. 2 and 6, the elastic means E is secured, at each of its ends, to an articulation member 20*a*, 20*b* housed, respectively, in a housing 21 provided on the link rod and 22 on another moving part of the machine, namely the push rod 18 in the example depicted. Each housing 21, 22 is open in a direction substantially the opposite of the direction of the force exerted by the elastic means E in the wall of the housing concerned. Disassembly of the articulation member 20*a*, 20*b* from its housing is done simply through a translational movement, exerting a force opposing that of the elastic means E. The articulation members 20*a*, 20*b* are retained in their housing through the force developed by the elastic means E.

The elastic means E advantageously consists of a spring leaf 23, substantially in the shape of a convex curved arc, particularly in the form of a semicircle, approximately. The leaf 23 is secured at each end to a cylindrical peg orthogonal to the plane of the arc of the curve, this peg constituting the articulation member 20*a*, 20*b*.

As a preference, the spring leaf 23 is made of plastic and is molded as one piece with the cylindrical pegs 20*a*, 20*b*. The spring leaf 23 has its convex face facing away from the end wall 6*a* of the piston.

The link rod 14 is articulated, at its end 14*a* remote from the housing 21 that accommodates the peg 20*a*, in a notch 24 (FIG. 6) that is fixed relative to the piston 4.

The link rod 14 (FIGS. 2 and 6) is advantageously formed of two parallel elemental link rods 25, 26 joined together by a cross member 27 closer to the end 14*b* than to the other end 14*a*. The ends of the link rods 25 and 26 that form the end 14*b* have a cylindrical shape the geometric axis of which is orthogonal to the longitudinal direction of the link rods. Each of these cylindrical ends has a housing 21 facing toward the other elemental link rod and open on the opposite side to the end 14*a*. Each housing 21 accepts one end of the peg 20*a* which projects transversely on each side of the leaf 23. As a preference, provision is made for the peg 20*a* to clip into the housing 21.

Each elemental link rod 25, 26 comprises two parallel branches between which there is, at the end 14*a*, a pivot pin 28 housed in the notch 24 of the piston. A pin 28 is provided for each elemental link rod 25, 26. Each pin 28 is molded as a single piece with the two branches of the elemental link rod. The two elemental link rods 25, 26 are molded as one piece with the cross member 27 so that the link rod 14 consists of a single plastic component.

The articulation notches 24 on the piston form a substantially semicircular housing in which a pin 28 can freely fit. The notches 24 are provided in mutually parallel walls 29, 30 parallel to the geometric axis of the piston, equidistant from these walls. The separation between the walls 29, 30 is equal to the separation between the hinge pins 28 of the two elementary link rods, while the thickness of the walls 29, 30 is less then the distance between the internal faces of the two parallel branches of one and the same elemental link rod. Each wall 29, 30 is flanked by two parallel branches of one and the same elemental link rod.

Each notch 24 is open in the opposite direction to force exerted by the elastic leaf 23 on the link rod 14, which force pushes each pin 28 against the closed end of the notch 24 and holds it there. The pin 28 is simply engaged in the notch 24, preferably without clipping. It is a particularly simple and quick matter to fit and remove the link rod 14, with its two pins 28 in the notches 24 respectively.

The push rod 18, as visible in FIG. 6, comprises a rod 31, for example of cruciform cross section, guided in sliding in a well 32 (FIG. 2) in the piston. The rod 31 comprises, substantially midway along its length, a groove 33 to house an O-ring 34 that allows for a sealed sliding through the well 32. The upper end of the rod 18 is secured to a frame 35 comprising a transverse mount secured to the top end of the rod 18. The frame 35 also comprises two longitudinal walls 35*a*, 35*b* parallel to the geometric axis of the rod 18, flanking the elastic leaf 23 and connected at the top by a cross member 36. Each wall 35*a*, 35*b* at its base secured to the rod 18 comprises a substantially semicircular notch 22 open to the opposite side to the link rod 14. Each notch 22 houses one of the ends of the pivot pin 20*b*, preferably clipped in. The frame 35 forms a kind of portal frame and the cross member 36 at the top constitutes the top end stop for the push rod.

The ends of the leaf 23 are preferably of reduced width thus determining the minimum permissible separation between the opposing faces of the interior end walls of the housing 21 or 22.

The push rod 18 with its frame at 35 is also made as a single piece from plastic. The pin 20*b* can be fitted into or removed from the housings 22 particularly quickly and simply, by elastic deformation of the leaf 23.

The two longitudinal walls 35*a*, 35*b* of the portal frame 35 comprise, toward the outside, on each side of the regions that have the notches 22, projections 37, for example in the shape of truncated pyramids, bounded by a flat top face parallel to the geometric axis of the rod 31 and orthogonal to the pin 20*b*. The projections 37 are capable of collaborating with walls 38 (FIGS. 5 and 6) in the form of upright dihedral planes, secured to the piston, and which guide the portal frame 35. The walls 38 meet the walls 30 at an edge parallel to the axis of the piston, on the opposite side to the notches 24.

Figure 4:
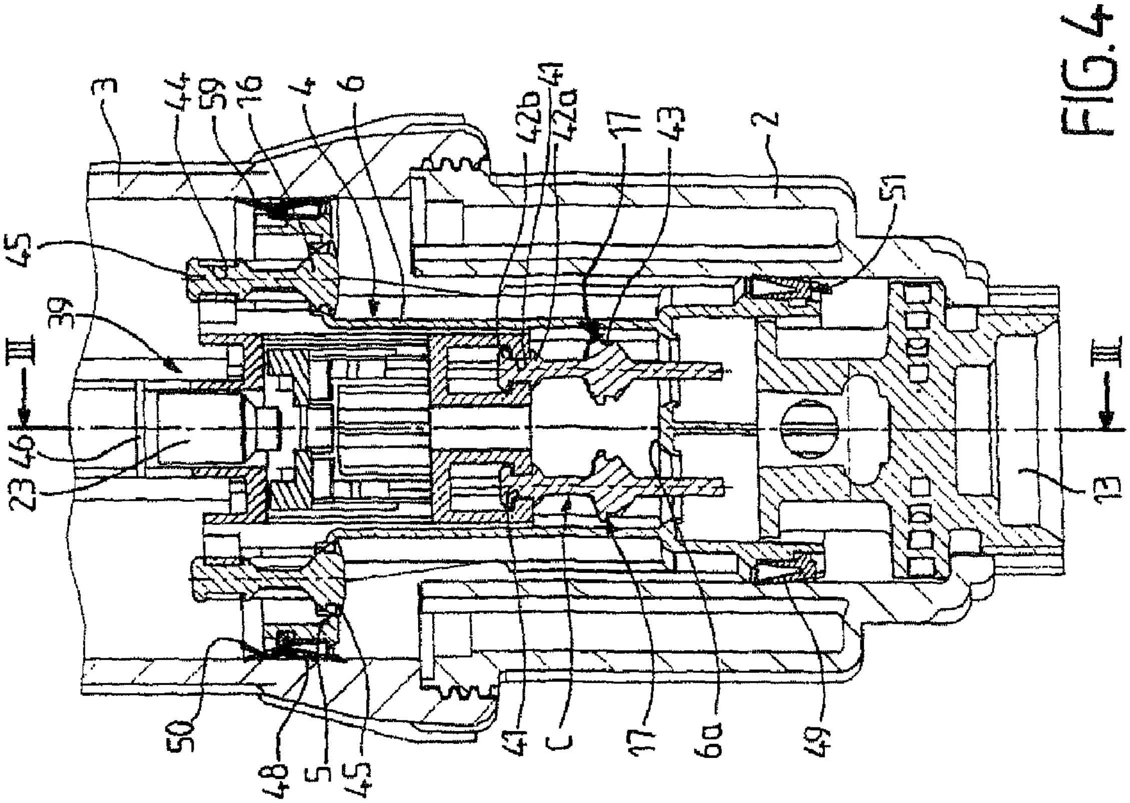
FIG. 4 is a partial vertical section on the section line IV-IV of FIG. 3.
Figure 3:
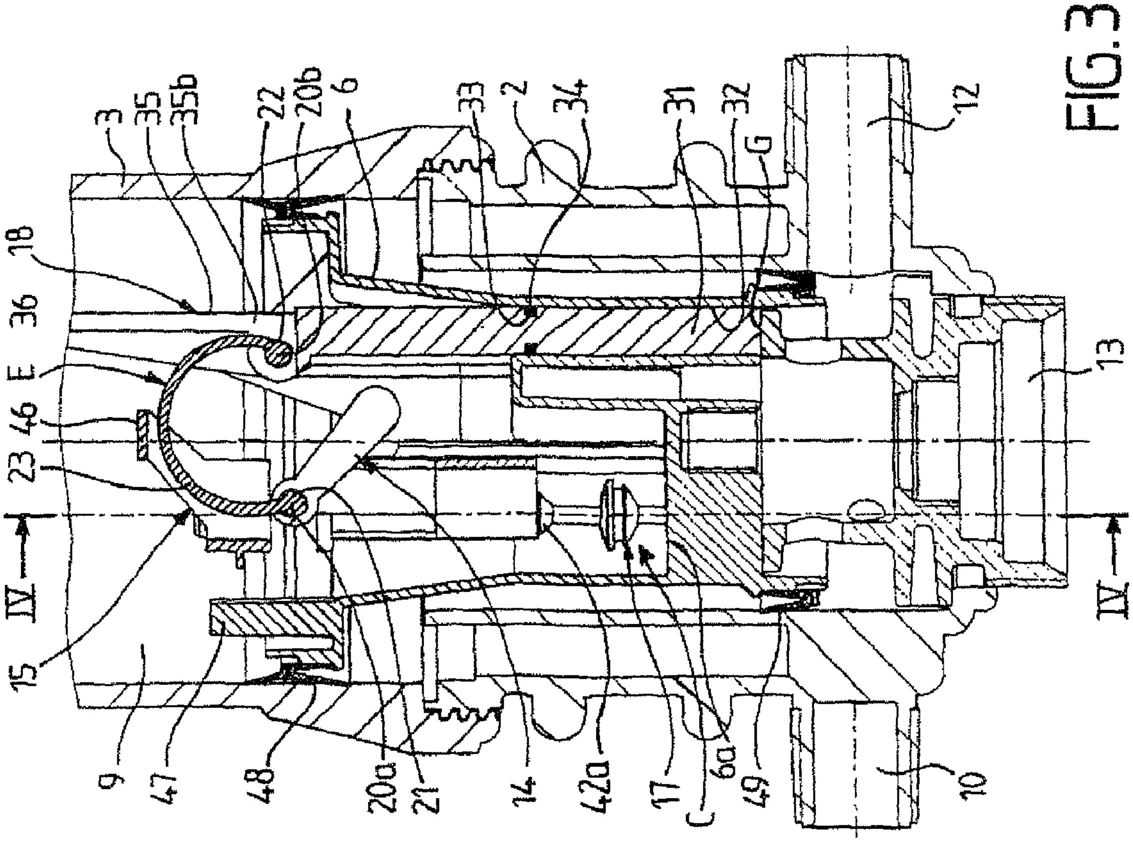
FIG. 3 is a partial vertical section of a hydraulic motor, on the section line of FIG. 4.

The valve shutters 16, 17 are mounted on the valve holders 15 (FIG. 6) with substantially the form of a frame 39 that is vertical when the motor is in the operating position, comprising on its two vertical sides ribs 40 projecting outward to collaborate with guide slots (not visible) provided in the piston 4. The horizontal lower side of the frame 39 has two open housings 41 allowing coupling, with clip fastening of the cylindrical stem of a valve 17, through a translational movement perpendicular to the plane of the frame 39. The lower edges of each housing 41 are housed, with a certain degree of clearance in a direction parallel to the axis of the piston, between two disks or flanges 42*a*, 42*b* (FIG. 4) secured to the valve stem. The actual valve shutter consists of a disk which, at its periphery, has a groove 43 (FIG. 4) to accommodate a seal.

The respective seats of the valves 17 are provided on the small cross section end wall 6*a* of the piston 4. The valve shutters 17 are situated on the same side of the piston 4 as the link rod 14.

The horizontal upper side of the frame 39 (FIG. 6) is extended beyond the vertical uprights of the frame and comprises at each end a housing 44 open laterally, with a cross section greater than that of a semicircle in order to accept, by clip fastening, a cylindrical stem (FIG. 4) secured to the valve shutter 16. The stem 45 comprises two radially projecting flanges between which the wall of the housing 44 is housed. Two valve shutters 16 are provided, these having two corresponding seats 45 on the large cross section 5 of the piston, symmetrically with respect to a plane passing through the axis of the piston and orthogonal to the axis of pivoting of the link rod 14.

The valves 16 are directed with their stem 45 extending upward and engaged through the opening in the seat to be attached to the housing 44 on the same side of the large cross section 5 as the link rod 14. When the cover 3 is removed, it is possible to gain access to the stem 45 of the valves 16 in order to fit them into the housings 44 or disengage them therefrom.

Figure 5:
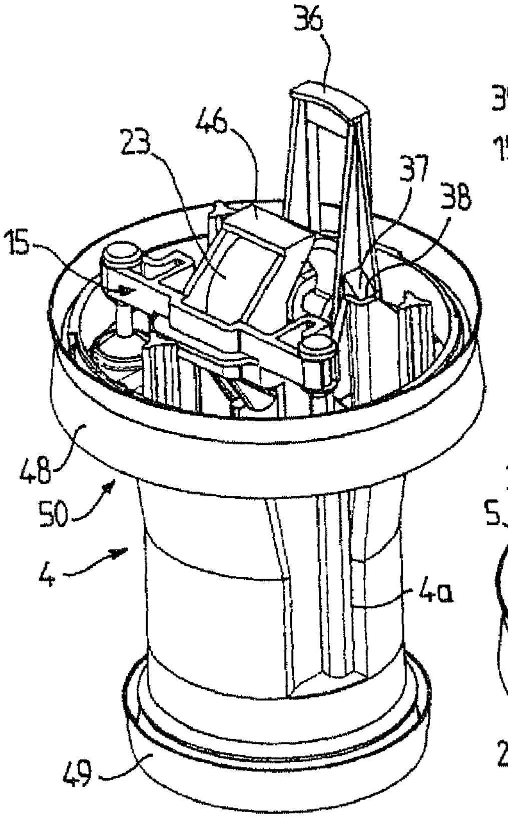
FIG. 5 is a perspective view of the differential piston with valves, valve carriers, elastic means and push rod in place.

The valve holder 15, 39 advantageously, on its horizontal upper side, comprises a yoke 46 projecting upward and via its lateral legs flanking the elastic leaf 23 (FIG. 5). This yoke 46 is designed to allow the machine to operate in bypass mode, with the valves held open, when it rests against the cover 3 of the casing, for example following failure of a part of the motor.

The valve holder 15, 39 forms a single piece which may be produced as a plastic molding.

Posts 47 of which there are three for example, with a cross section in the shape of a three-branch star, secured to the large cross section 5 of the piston, project upward parallel to the axis of the piston and are spaced 120' apart near the periphery of the piston. The posts 47 constitute mechanical safety stops butting against the cover 3 of the casing if a part breaks or in the event of excess delivery, the height of these posts 47 being determined accordingly.

The piston 4 is equipped, at its large cross section and its small cross section, with sealing lips 48, 49 (FIGS. 6 and 7) facing toward one another.

Figure 7:
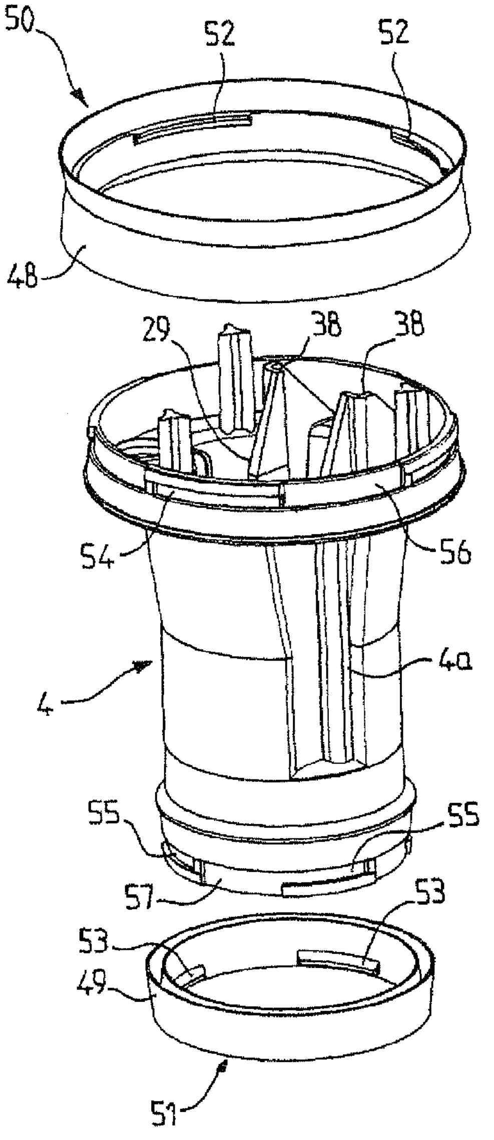
FIG. 7 is an exploded perspective view of the piston alone and of the seals, disassembled.

The sealing lips 48, 49 are provided on detachable circular sealing rings 50, 51 clearly visible in FIG. 7. The piston 4 can thus be molded as a single piece, advantageously made of plastic.

Each sealing ring 50, 51 is advantageously fixed to the piston 4 by a bayonet-type assembly comprising radial projections 52, 53 on the internal surface of respective rings 50, 51. The projections (52, 53) are capable of collaborating with corresponding peripheral slots 54, 55 provided on the external surface of the large cross section and of the small cross section of the piston. Recesses 56, 57 with genatrices parallel to the axis of the piston are provided on the exterior periphery of the large and small cross sections to allow the radial projections 52, 53 to be brought to face the entrance to the peripheral slots 54, 55 through a translational movement parallel to the axis of the piston. Then, by rotating about this axis of the piston, the ribs 52, 53 are engaged in the slots 54, 55 immobilizing the corresponding sealing ring 50, 51. The rings 50, 51 can be removed quickly through a reverse movement.

Figure 9:
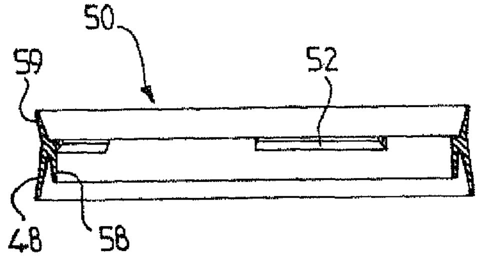
FIG. 9 is a section on IX-IX of FIG. 8.
Figure 10:
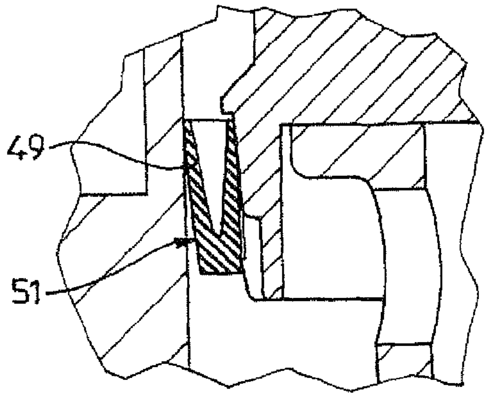
FIG. 10 is a vertical section through the seal for the small cross section of the piston.

As can be seen FIG. 9, the sealing ring provided at the large cross section of the piston has a V-shaped profile the concave side of which faces toward the small cross section, that is to say downward according to the depiction of the drawings. This V-profile is bounded on the outside by the lip 48 which seals against the wall of the casing and, on the inside, by a slightly frustoconical lip 58 which seals against the piston.

The ring 50 comprises, on the opposite side to the lips 48, 58, another frustoconical sealing lip 59 facing in the opposite direction, the diameter of which increases in the direction of the cover of the casing. This lip 59 protects the region of sealing between piston and casing, at the lip 48, against any falling abrasive particles.

The circular ring 51 of the small cross section of the piston has a cross section in the shape of a V the concave side of which faces toward the large cross section end, that is to say upward according to FIG. 7. The outer branch of the V forms the lip 49 that seals between piston and casing.

The outer wall of the piston 4, as can be seen in FIG. 6, comprises two recessed regions such as 4*a*, extending under the seats of the valves 16 and allowing these valves their reciprocating vertical movements.

The motor M can be assembled as follows.

The sealing rings 50, 51 shown in FIG. 7 can be assembled with the piston 4, by bayonet fastening, before the valves are fitted.

A sub-assembly (FIG. 6) can be formed by fitting the peg 20*b* of the elastic leaf 23 into the notches 22 of the push rod 18 while the peg 20*a* is engaged in the housings 21 in the link rod 14. This sub-assembly can then be fitted into the piston 4 by fitting the rod part 31 of the push rod 18 into the guide well 32 and by fitting the pins 28 of the link rod 14 into the notches 24.

The fact that the leaf 23 is retained, by the clipping of the peg 20*a* into the housings 21 in the link rod and the peg 20*b* into the notches 22, makes the sub-assembly (link rod 14-elastic leaf 23-push rod 18) easier to handle during assembly.

Another sub-assembly is prepared from the valve holder 15, 39, into the lower part of which the valves 17 are clipped. The valve holder 15, 39 is then fitted into the piston 4 in a vertical downward movement, introducing the ribs 40 into the corresponding guide slots in the piston.

The valves 16 with their stems directed upward are then offered up under the annulus 5. The stem 45 of each valve 16 is then slipped through the opening in the corresponding seat so that the upper end of this stem can be clipped into the housing 44 in the valve holder 15, 39.

The piston, push rod, link rod and valve holder assembly is assembled. All that is then required is for the piston to be fitted into the body 2 and the cover 3 assembled on the body 2 by screwing.

The operations of disassembling or of replacing defective parts can be deduced from the aforegoing explanations and are extremely quick and easy to perform.

The way in which the motor works is similar to the working described in EP 1 151 196 and will be recalled only briefly with reference to FIG. 1 in which the piston 4 is on up-stroke. The pressurized liquid, generally water, arrives via the inlet 10. The valves 16 are closed whereas the valves 17 are open, allowing liquid to be discharged from the chamber 9 to the chamber 11 and the outlet 12.

At the end of the up-stroke, the push rod 18 comes to bear against a stop attached to the cover 13 and this, and the effect of the spring leaf 23, causes the link rod 14 to switch to the low other stable position, with the valve holder 15 moving toward the end wall 6*a* of the piston. The valves 17 close while the valves 16 open. The pressurized liquid enters the closed chamber 9 and then movement of the piston is reversed.

At the end of the down-stroke, the push rod 18 via its lower end meets an end stop G secured to the casing, causing the link rod 14 to switch once again to its raised position and causing the valve holder 15 to move, leading to closure of the valves 16 and opening of the valves 17. The movement of the piston 5 is once again reversed, and the piston begins another up-stroke.

Figure 8:
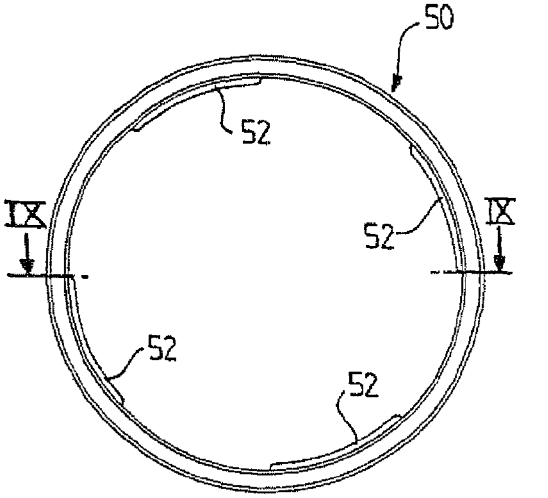
FIG. 8 is a view from beneath of the seal for the large cross section of the piston.
Figure 11:
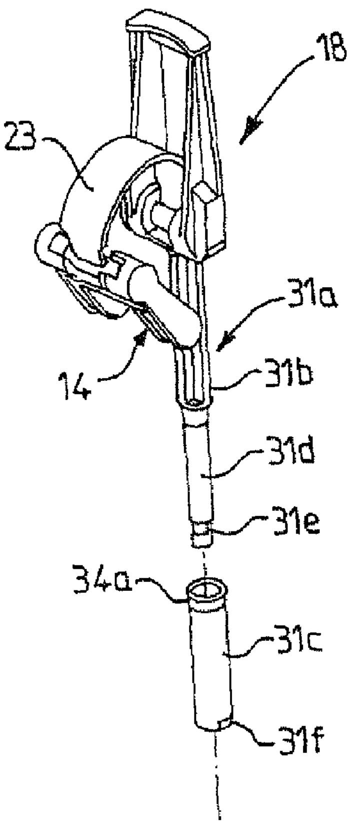
FIG. 11 is a perspective view of an alternative form of embodiment of the push rod made in two parts in the process of being assembled.

FIG. 11 illustrates an alternative form of embodiment of the push rod 18, the rod part 31*a* of which is made in two parts 31*b*, 31*c* assembled disconnectably. The upper part 31*b* is extended downward by a cylindrical barrel 31*d* of an outside diameter smaller than that of the upper part 31*b*. The lower part 31*c* is a cylindrical tube to accept the barrel 31*d*. Some form of locking mechanism is provided to lock the two parts together, this in particular being a bayonet system 31*e*, 31*f* provided at the lower end of the parts. The push rod seal advantageously consists of a plastic ring 34*a* of V-shaped cross section with a double lip similar to the ring 51 but of a smaller diameter. The concave side of the V preferably faces upward. The ring 34*a* is mounted on the lower part 31*c* with a quarter-turn bayonet fastening system similar to the one described with reference to FIGS. 7 to 9. This type of assembly makes it easy to change the ring 34*c* in the event of it becoming worn and a plastic that has good chemical inertia with respect to the liquids passing through the motor and the metering device is chosen for the ring 34*a*.

Figure 12:
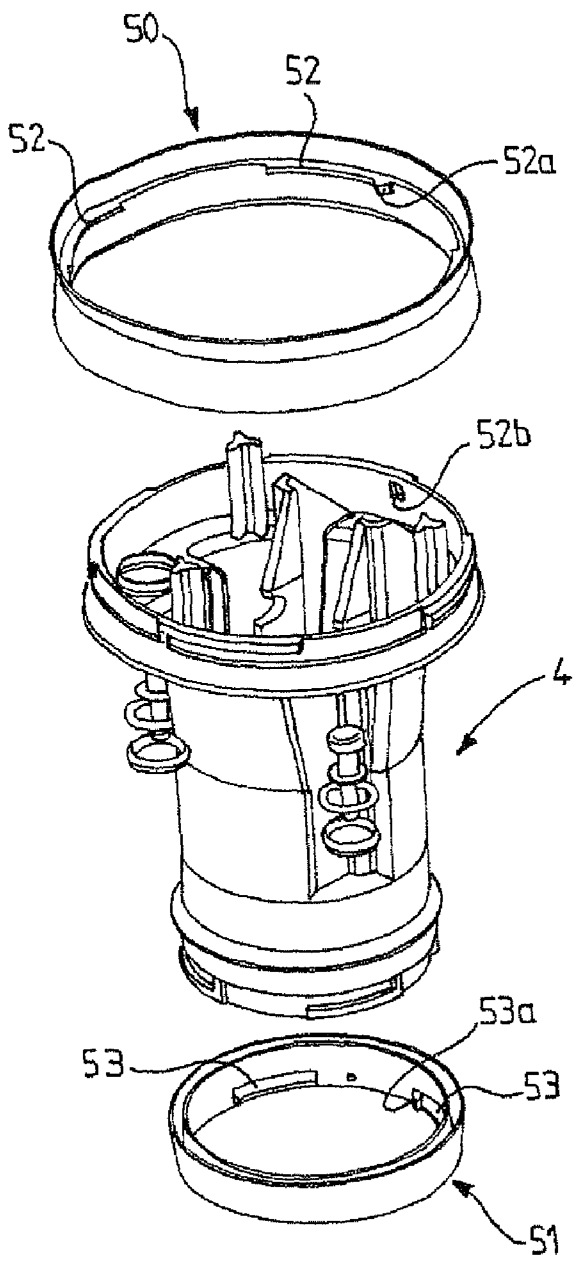
FIG. 12 is an exploded perspective view similar to FIG. 7, showing an alternative form of embodiment of the piston and of the seals.

FIG. 12 illustrates an alternative form of embodiment of the detachable sealing rings 50, 51. In this alternative form, the rings 50, 51 are designed to clip-fasten onto the piston 4 at the end of the rotation of the bayonet assembly. For that, the ring 50 comprises an inward radial projection 52*a* provided at one end of a rib 52. A corresponding aperture 52*b* is provided in the side wall of the piston so at the end of rotation of the assembly, the projection 52*a* enters the aperture 52*b*. The ring 50 is thus locked in terms of rotation and any unwanted detachment of the ring 50 during operation is thereby prevented. In order to detach the ring 50, the projection 52*a* is pushed outward through the aperture 52*b*, from the inside, using a tool, in order to disengage it from the aperture.

A similar arrangement is provided for the lower ring 51 which has an inward radial projection 53*a*, at one end of a rib 53, to fit into an aperture, not visible in the drawing, in the piston 4.

The hydraulic motor, more generally the hydraulic machine, according to the invention can be made entirely from plastic, including the elastic means E formed by the leaf 23, and is highly resistant to chemical products with no metal parts.

The number of constituent parts that make up the machine is considerably reduced. Assembly and maintenance are simplified and made easier.

The sealing ring 50 for the large cross section of the piston incorporates a protective lip 59. The detachable sealing rings 50, 51 maintain sealing in opposite directions so that additive entering the outlet chamber 11 via the sleeve 13 can be injected.

The mechanism that controls the switching of the link rod 14 and the changing of position of the valve holder 15, 39 is particularly simple and of the three-point type.

The invention claimed is:

1. A differential hydraulic machine, comprising:

a casing (1);

a differential piston (4) having a region (5) of large cross section and a region (6*a*) of smaller cross section capable of sliding in a reciprocating movement in the casing and in a smaller-diameter housing coaxial to the casing, respectively, the piston separating two chambers (8, 9) of the casing;

hydraulic switching means (C) for supplying liquid to and emptying from the two chambers separated by the differential piston, the hydraulic switching means being controlled by the reciprocating movement of the piston and being able to adopt two stable positions; and triggering means capable of causing, at end of the travel of the piston, a sudden change in a position of the hydraulic switching means, under action of an elastic means (E), in order to reverse travel of the piston, the piston (4) being equipped, in the region of the large cross section (5) and of the region of smaller cross section (6*a*), with sealing lips (48, 49) directed in opposite directions, wherein the sealing lips (48, 49) are provided on detachable circular rings (50, 51) and the piston (4) is molded as a single piece; and wherein each of the detachable circular rings (50, 51) is fixed to the piston by an assembly of a bayonet type.

2. The hydraulic machine according to claim 1, wherein the assembly of the bayonet type comprises radial projections (52, 53) on an internal surface of the detachable circular rings and corresponding peripheral slots (54, 55) on an external surface of the piston, with portions of the peripheral slots (56, 57) being parallel to a geometric axis of the piston to allow each of the radial projections of the detachable circular rings to align with a corresponding one of the portions of the peripheral slots of the piston.

3. The hydraulic machine as claimed in claim 1, wherein one of the detachable circular rings (50) provided in the region of large cross section of the piston has a V-shaped profile with a concave face facing toward the region of smaller cross section and, on an opposite side, a frustoconical sealing lip (59) having a diameter that increases in a direction toward a cover of the casing.

4. The hydraulic machine as claimed in claim 1, wherein one of the detachable circular rings (51) for the region of smaller cross section of the piston has a V-shaped cross section with a concave face facing toward the region of large cross section.

5. The hydraulic machine as claimed in claim 1, wherein the detachable circular rings (50, 51) clip onto the piston (4) at an end of the bayonet type assembly.

6. The hydraulic machine as claimed in claim 1, wherein the detachable circular rings (50, 51) are made of plastic.

7. A differential piston for a hydraulic machine, comprising:

a region (5) of large cross section and a region (6*a*) of smaller cross section able to slide in a reciprocating movement in a casing and in a smaller-diameter housing coaxial with the casing, respectively, the piston separating two chambers (8, 9) of the casing, and the piston (4) being equipped in the region of large cross section (5) and of the smaller cross section (6*a*) with sealing lips (48, 49) directed in opposite directions, wherein the piston (4) is molded as a single piece and comprises means of assembly with detachable circular rings (50, 51) on which the sealing lips (48, 49) are provided; and wherein the means of assembly with the detachable circular rings (50, 51) are of a bayonet type.

8. The differential piston as claimed in claim 7, wherein the bayonet-type means of assembly comprise radial projections (52, 53) on an internal surface of the detachable circular rings and corresponding peripheral slots (54, 55) on an external surface of the piston, with portions of the peripheral slots (56, 57) being parallel to a geometric axis of the piston to allow each of the radial projections to align with a corresponding one of the portions of the peripheral slots of the piston.

9. The differential piston as claimed in claim 7, further comprising at least one aperture (52*b*) for clip-fastening of at least one of the detachable circular rings (50) at an end of the bayonet type assembly.

10. The hydraulic machine as claimed in claim 7, wherein one of the detachable circular rings (50) provided in the region of large cross section of the piston has a V-shaped profile with a concave face facing toward the region of smaller cross section and, on an opposite side, a frustoconical sealing lip (59) having a diameter that increases in a direction toward a cover of the casing.

11. The hydraulic machine as claimed in claim 7, wherein one of the detachable circular rings (51) for the region of smaller cross section of the piston has a V-shaped cross section with a concave face facing toward the region of large cross section.

12. The hydraulic machine as claimed in claim 7, wherein the detachable circular rings (50, 51) clip onto the piston (4) at an end of the bayonet type assembly.

13. The hydraulic machine as claimed in claim 7, wherein the detachable circular rings (50, 51) are made of plastic.

14. The differential piston as claimed in claim 8, further comprising at least one aperture (52*b*) for clip-fastening of at least one of the detachable circular rings (50) at an end of bayonet type assembly.

* * * * *